March 19, 1968 — R. P. DOERER — 3,373,474
SWAGING MACHINE
Filed Nov. 8, 1965 — 2 Sheets-Sheet 1
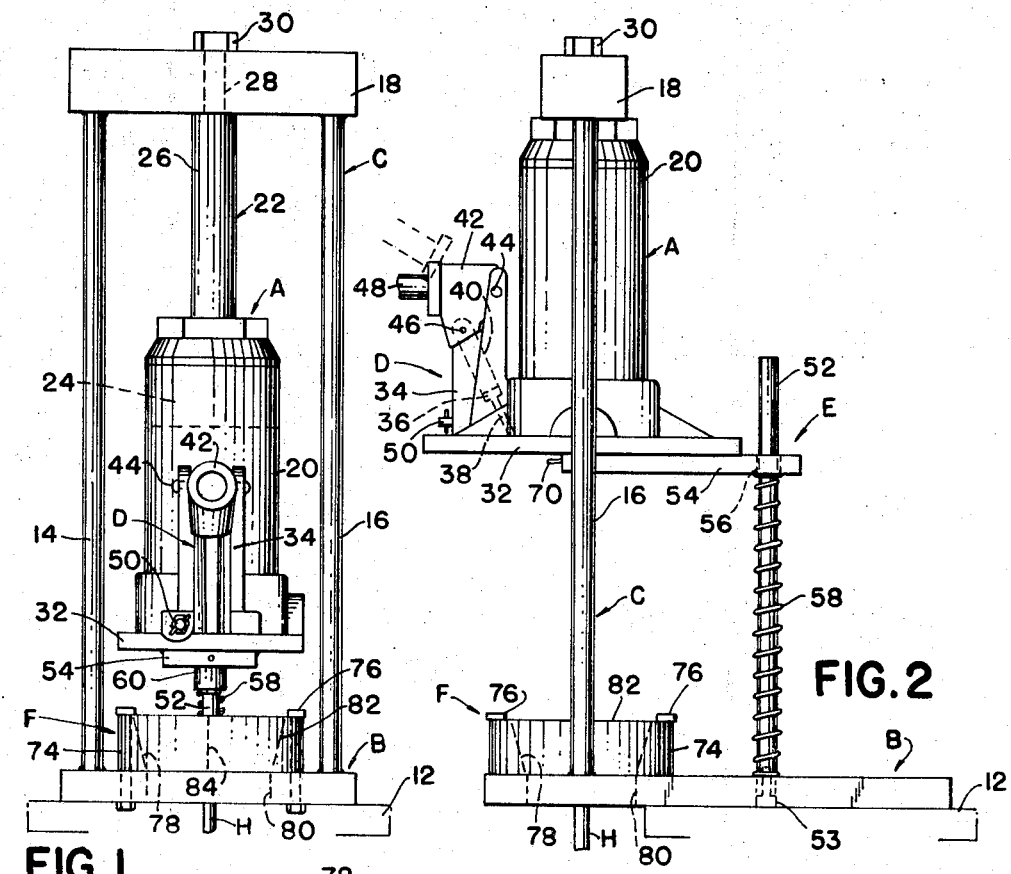
FIG. 1
FIG. 2
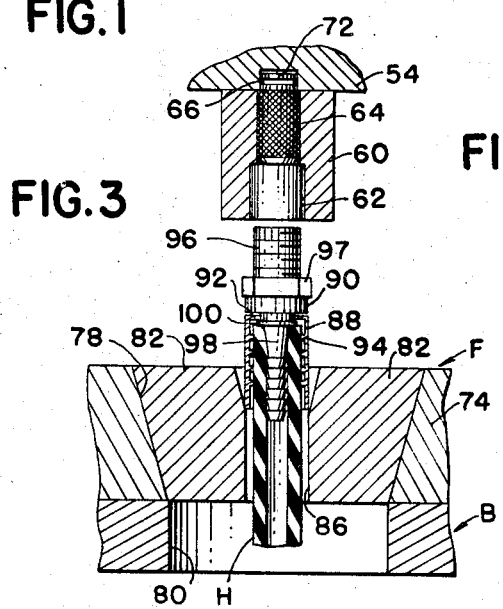
FIG. 3
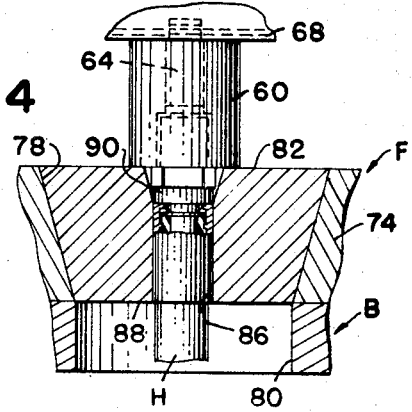
FIG. 4
INVENTOR.
RICHARD P. DOERER
BY Whitemore, Hulbert & Belknap
ATTORNEYS March 19, 1968 R. P. DOERER 3,373,474
SWAGING MACHINE
Filed Nov. 8, 1965 2 Sheets-Sheet 2
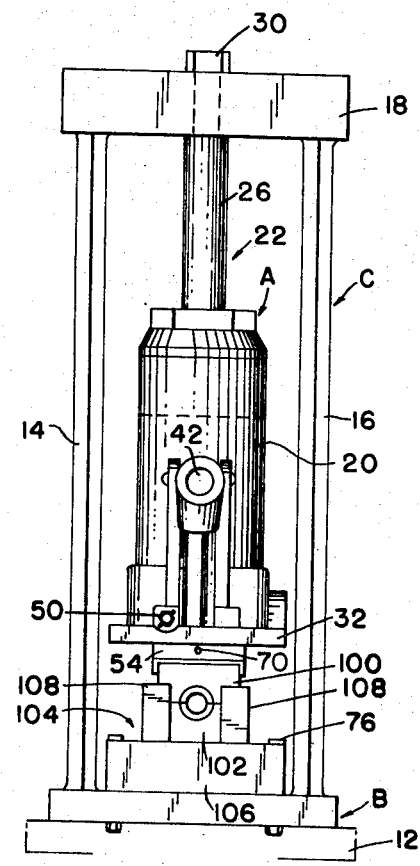
FIG. 5
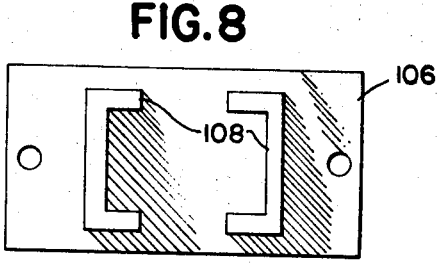
FIG. 8
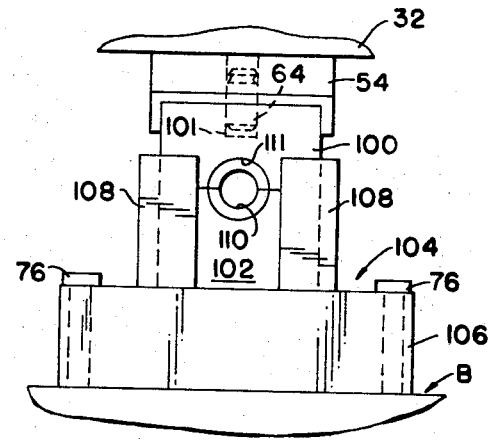
FIG. 6
FIG. 7
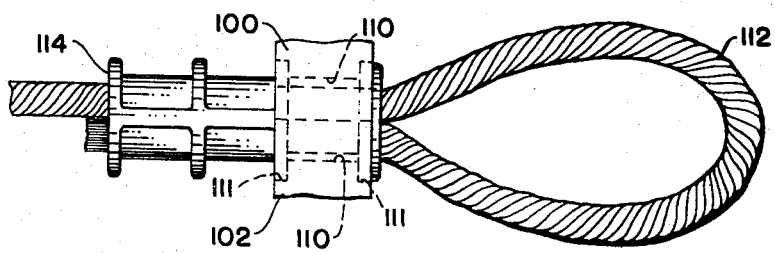
INVENTOR.
RICHARD P. DOERER
BY
Whittemore, Hulbert & Belknap
ATTORNEYS

United States Patent Office 3,373,474
Patented Mar. 19, 1968

1

3,373,474
SWAGING MACHINE
Richard P. Doerer, Ypsilanti, Mich., assignor, by mesne assignments, to Van Dresser Corporation, a corporation of Michigan
Filed Nov. 8, 1965, Ser. No. 506,706
9 Claims. (Cl. 29—200)

ABSTRACT OF THE DISCLOSURE

The swaging machine has laterally spaced, parallel rods extending from the base and connected by a cross-member. A piston-cylinder assembly between and in the plane of the rods has its piston connected to the cross-member. A swaging member is connected to the cylinder opposite a work support on the base to secure a fitting on a workpiece when the cylinder is moved toward the base. A fluid pump adapted to operate the piston-cylinder assembly is mounted on the cylinder at one side of the plane of the piston-cylinder assembly and rods, and is actuated by a handle projecting away from the plane. A guide rod for the cylinder projects from the base at the opposite side of the plane to resist distortion of the piston-cylinder assembly due to operation of the pump.

The machine may be readily adapted either to swage a fitting such as a coupling on a hose or to swage a fitting such as a sleeve on a cable, wire rope or the like, depending upon the particular swaging member and work support employed.

---

This invention relates generally to a swaging machine, and refers more particularly to a machine for swaging a coupling on the end of a hose, or for swaging a fitting or sleeve on a cable, wire rope or the like.

An essential object of the invention is to provide a swaging machine which is rugged, is economically constructed of a relatively few simple parts and yet is highly effective in the performance of its intended function.

Another object is to provide a machine which can be readily adapted to swage a coupling on the end of a hose, or to swage a fitting on a cable, wire rope or the like.

Another object of the invention is to provide a machine which will secure the coupling or fitting on the hose, wire rope or cable with a swaging action to form a strong connection.

Another object is to provide a swaging machine provided with a reciprocable member for applying the pressure required to carry out the swaging operation, having an improved arrangement for guiding the movement of the reciprocable member.

Another object is to provide a machine having a fluid operated reciprocable member for applying the necessary swaging pressure, a pump carried by the member at one side thereof and manually operable to actuate the member, and a guide for the member located at the opposite side thereof to resist any distortion of the member due to the operation of the pump.

Another object is to provide a swaging machine having a piston-cylinder assembly provided with a member on the reciprocable part of the assembly adapted to apply the swaging pressure, a pump carried by the reciprocable part at one side thereof to operate the latter, and guide rod at the opposite side of the piston-cylinder assembly for guiding the movement of the reciprocable part and resisting distortion thereof due to operation of the pump.

Another object is to provide a frame to which the piston-cylinder assembly is secured, having support rods on opposite sides of the piston-cylinder assembly, the cylinder of the assembly being the reciprocable part and free from connection with the support rods but slidably

2 engaging a guide rode at one side of the piston-cylinder assembly.

Other objects and features of the invention will become apparent as the description proceeds, especially when taken in conjunction with the accompanying drawings, wherein:

FIGURE 1 is a front elevational view of a swaging machine embodying my invention, in which the machine is conditioned for swaging a coupling on the end of a hose.

FIGURE 2 is a side elevational view of the swaging machine shown in FIGURE 1.

FIGURE 3 is an enlarged fragmentary sectional view showing the coupling installed on the end of the hose before it has been swaged.

FIGURE 4 is similar to FIGURE 3 but shows the coupling after it has been swaged on the end of the hose.

FIGURE 5 is like FIGURE 1, but shows the machine set up to swage a fitting on a cable or wire rope.

FIGURE 6 is an enlarged fragmentary view of a portion of FIGURE 5.

FIGURE 7 is a fragmentary view showing the dies of the machine in FIGURE 5 swaging a sleeve on a cable.

FIGURE 8 is a top plan view of the die holder in FIGURES 5 and 6 with the die removed.

Referring now more particularly to the drawings, and especially to FIGURES 1-4, the swaging machine includes a fluid piston-cylinder assembly A, a base B, an upright frame C for supporting the piston-cylinder assembly on the base, a pump D for manually operating the piston-cylinder assembly, guide means E for guiding the vertical movement of the cylinder, and a die F. The machine shown in FIGURES 1-4 is set up to swage a coupling on a hose, but can be readily converted to swage a fitting on a cable or wire rope or the like, as will appear more fully hereinafter.

The base B is in the form of a flat horizontal plate shown supported on a workbench or other fixed support 12. The base B rests upon the support 12 in a manner such that its front end portion overhangs the front edge of the support for a purpose which will become more apparent as this description proceeds.

The upright frame C includes a pair of laterally spaced vertical support rods or posts 14 and 16 extending upwardly from the front portion of the base in parallel relation. These rods may be of round, square, or any other suitable cross-section, and are permanently secured to the base. A horizontal crosspiece 18 extends between and is secured to the upper ends of rods 14 and 16 by any suitable means such as welding or, preferably, bolting.

The piston-cylinder A includes a cylinder 20 and a piston 22. The piston 22 has a head 24 slidable within the cylinder. A rod 26 extends from the head and projects through an aperture in the upper end of the cylinder. The cylinder 20 and piston 22 are arranged vertically in the plane established by support rods 14 and 16 and crosspiece 18, and is midway between the support rods. The upper end of the piston rod 26 is secured to the crosspiece by any suitable means. One such means is shown and comprises a reduced extension 28 on rod 26 which extends through the crosspiece 18 midway between the ends thereof, and a nut 30 threaded on the upper end of the extension. The piston 22 is thus rigidly secured to the frame C.

The cylinder 20 is capable of reciprocating vertically with respect to the piston 22. It is moved downwardly by the operation of the manual pump D. The cylinder 20 has a flat horizontal plate 32 formed integrally on its lower end providing a pump support. The pump D comprises a pump body 34 permanently secured upon the front end portion of the plate 32 in forwardly spaced relation to the piston-cylinder assembly A and the plane of frame C. The pump body 34 has a cylinder bore 36 therein communicating with the interior of the cylinder 20 through passage 38. A plunger 40 reciprocates in bore 36 to force air under pressure into cylinder 20. The plunger 40 is reciprocated by an actuator 42 pivoted at 44 to the pump body 34. The actuator is connected to plunger 40 by a second pivot 46. A rod 48, removable from the actuator, extends forwardly therefrom and may be employed to oscillate the actuator 42 up and down to reciprocate plunger 40 and thereby force air under pressure into cylinder 20. This action forces the cylinder downwardly.

The cylinder 20 may be vented by the operation of a screw 50 which rotates into a passage in the pump body, the passage communicating with the cylinder 20. When the screw is loosened, cylinder 20 is vented. The screw is tightened to seal the cylinder 20.

The guide means E for the cylinder includes a vertical guide rod 52 secured to and extending upwardly from base B in parallel relation to support rods 14 and 16. Bolt 53 removably secures the lower end of guide rod 52 to base B. The guide rod 52 is spaced directly to the rear of piston-cylinder assembly A and the plane of frame C. A flat horizontal guide plate 54 is secured to the underside of the support plate 32 and projects rearwardly from the cylinder. Guide plate 54 has a hole 56 through which the guide rod 52 slidably extends. The hole may have a bushing in it, if desired. A coil spring 58 encircles the guide rod and is compressed between the base B and guide plate 54.

A pusher 60 is removably connected to the underside of the guide plate 54. The pusher 60 is in the form of a cylindrical body having a cylindrical socket 62 in the underside. A pin 64 is provided with a knurled body and has a press fit in a hole in the top of the pusher so that the pusher is removably secured to the pin. Pin 64 extends into a socket 66 in the underside of the guide plate 54. The socket 66 is cylindrical so that the pin 64 can be inserted into and removed from the socket. A horizontal passage 68 in the guide plate 54 extends from the front edge of the guide plate and intersects the socket 66. A cotter pin 70 is removably disposed in the passage and engages an annular groove 72 in the pin 64 to releasably retain the pusher.

The die F is positioned on the front portion of the base directly beneath cylinder 20. The die includes an annular holder 74 secured to the top surface of base B by bolts 76. The holder 74 is annular and its inner surface 78 is conical and provides a seat for the removable die halves 82. The base has a cylindrical hole 80 in registration with the conical seat 78. The two die segments or halves 82 have outer surfaces of the same conical form as the seat 78, and may be inserted into the seat 78 from above. The meeting surfaces of the half-segments are indicated in FIGURE 1 by the line 84. The half-segments are so shaped that together they form a vertical die opening 86 when the die halves are in place as shown in the drawing. This opening extends completely through the die, its lower major portion being cylindrical and its upper portion flaring as shown in FIGURES 3 and 4. The die opening 86 is in vertical alignment with the socket 62 in the pusher assembly.

The machine as it is shown in FIGURES 1-4, is set up to swage a fitting such as a coupling on the end of a hose. The hose is designated H in the drawing and the coupling includes a ferrule 88 and a spud 90. The ferrule is a cylindrical sleeve open at one end and having an inwardly turned flange 92 at the upper end defining an opening for the spud 90. The inner surface of the ferrule has the axially spaced, circumferentially extending annular ribs 94. The spud has a threaded end 96 and a nut portion 97. Its opposite end is of reduced diameter to provide a stem 98 with serrations. At the top of the stem the spud has a transverse circular disk-shaped portion 100.

The ferrule in its initial condition is dimensioned to be sleeved over the end of the hose. It can be pushed on by hand. For this purpose the inner diameter of the ridges 94 will either clear the outer surface of the hose or at least will not engage the hose so firmly as to prevent the sleeving of the ferrule on the hose end by hand. The spud is pressed into the hose. The serrations may slightly expand the inner diameter of the hose but not so much as to prevent the spud from being installed manually as shown in FIGURE 3. The diameter of the disk portion 100 is less than the size of the opening defined by flange 92 so that the disk can pass through the opening.

The coupling including the ferrule and spud are shown in FIGURE 3 assembled on the end of the hose, and the hose end is projected upward through the die opening. In order to accomplish this, one of the die halves 82 will first be removed to project the hose end upwardly through the die, and then the die half will be reinstalled. When the hose end is released it will descend until the lower end of the ferrule engages the lower portion of the flaring part of the die opening. The cylindrical portion 86 of the die opening is of smaller diameter than the ferrule. The reason that the base overhangs the support 12 is to enable the hose to be projected upward through the die opening.

In order to swage the coupling on the hose end, the pump actuator 42 is operated by handle 48 to pump air under pressure into cylinder 20 and cause it to descend. The socket 62 in the pusher 60 will fit over the upper threaded end 96 of the spud and the lower end of pusher 60 will engage nut 97 and push the coupling and hose end downwardly into the lower cylindrical portion 86 of the die opening. This downward movement of the cylinder will continue until the pusher engages the die as seen in FIGURE 4. During this movement, the hose end and the coupling will be forced into the lower cylindrical portion 86 of the die opening, causing the ferrule 88 to be swaged and reduced in diameter. The ribs 94 will move radially inwardly and project into and grip the outer surface of the hose end as shown in FIGURE 4. The flange 92 will be moved radially inwardly to overlie the disk portion 100 on the spud and secure it against the end of the hose.

During the downward movement of the cylinder 20, it will be guided by the rod 52. The pumping action may tend to distort the vertical alignment and movement of cylinder 20, but the guide rod 52 will help resist any such tendency.

It will of course be noted that the cylinder 20 is entirely free of connection with supporting rods 14 and 16 of the frame, being guided in its movement by the guide rod 52. This is a simple and inexpensive guiding arrangement, yet has been found in practice to be very satisfactory.

After the cylinder 20 has been forced downwardly by fluid pressure to the FIGURE 4 position, the screw 50 is backed out of its passage to vent the cylinder. The spring 58 compresesd between the base B and the guide plate 54 will thereupon force the cylinder 20 upwardly to its FIGURE 2 position. At this time, one of the die halves 82 may be removed in order to remove the hose with the coupling swaged on the end. Another hose with a coupling manually installed on the end may then be placed in the die and the removed die half replaced in preparation for a repeat cycle. The screw 50 will of course be screwed in tight to close the vent passage.

As already stated, the swaging machine may be readily converted to swage a fitting such as a sleeve on a cable, wire rope or the like. The machine is shown set up to swage a fitting such as a sleeve on a cable or wire rope in FIGURES 5-8. The frame C including the vertical support rods or posts 14 and 16 and the horizontal crosspiece 18, and the base B are formed integrally as a casting rather than being separately formed and secured together as in FIGURES 1-4. The posts are shown as being polygonal, although they may obviously be cylindrical as in FIGURES 1–4. Otherwise the machine in FIGURES 5–8 is identical with the machine of FIGURES 1–4, except of course that the pusher 60 and die F including holder 74 and die parts 82 have been replaced by suitable parts for swaging a sleeve on a cable or wire rope.

The pusher 60 has been replaced in FIGURES 5–8 by an upper die 100 which has a cylindrical socket 101 adapted to have a press fit on the knurled body portion of the pin 64. The pusher 60 may be readily removed from the pin 64 and the die 100 substituted in its place. The pin 64 is not removed from the plate 54 for this purpose.

The sleeve is swaged on the cable or wire rope by the die 100 in cooperation with a lower die 102. The lower die 102 is carried by a die support 104. The die support 104 comprises a base 106 which is secured to the base B of the machine by bolts 76. These are the same bolts which secured the die holder 74 to the base B in FIGURES 1–4. The base 106 has passages aligned with the openings in the base B to accommodate bolts 76.

The die holder includes the spaced, opposed, channel-shaped guide members 108 which extend upwardly from base 106. Guide members 108 define a vertical opening into which the lower die 102 may be inserted. The lower die is held between the guide members by gravity and may be easily inserted and removed from the top of the guide members.

The upper and lower die members 100 and 102 have opposed, semi-cylindrical swaging surfaces 110 which together define a cylinder. These die surfaces 110 have flaring semi-cylindrical portions 111 on both sides thereof.

The cable or wire rope is generally designated 112 and is shown with an end doubled over. A sleeve 114 embraces the cable and doubled over end and the cable and sleeve are shown in FIGURE 7 in position between the dies with the sleeve having been swaged at least in one section on the cable and its doubled over end.

In operation, the cylinder 20 is raised and the doubled over end of the cable is placed in the lower die with the sleeve embracing it. The cylinder is then lowered to swage a section of the sleeve about the cable and its doubled over end, as shown in the drawings. The cylinder may then be raised and the cable moved axially to present another section of the sleeve for swaging during the next downward movement of the cylinder. The sleeve may thus be swaged upon the cable at two or more axially spaced points. As seen in FIGURE 7, the sleeve has been swaged at three points.

It will be apparent that the machine may be readily converted to secure a coupling on the end of a hose or to swage a sleeve on a cable or wire rope. The pusher 60 and upper die 100 may be readily pressed on to the knurled body portion of the pin 64 with a press fit and just as easily removed. The die holder 74 for the hose die and the die support 104 for the cable die may be easily installed and replaced by the bolts 76.

The guide rod 52 may be readily removed from the base B by removing bolt 53. The piston-cylinder assembly A may then be removed, when desired, by unbolting the upper end of piston rod 26 from crosspiece 18, lowering the assembly and moving it rearwardly through the space previously occupied by the guide rod.

With reference again to FIGURE 6, it will be noted that on downward movement of the cylinder the upper die 100 moves into the space between and is guided by the channel-shaped members 108, being of substantially the same rectangular cross-section as the space defined by members 108. Hence, the upper die will be properly oriented and aligned with the lower die during the swaging action.

I claim:

1. A machine for swaging a fitting on a workpiece comprising a base, a frame including a pair of laterally spaced parallel rods extending from said base and a horizontal cross-member extending between and connected to the ends of said rods remote from said base, a fluid piston-cylinder assembly having a cylinder and a piston provided with a piston head slidable within said cylinder, means fixing one end of said piston to said cross-member, said piston-cylinder assembly being positioned in the plane of said rods and said cylinder being reciprocable relative to said piston toward and away from said base, a workpiece support on said base, a swaging member connected to said cylinder in a position opposite said support and adapted to act in cooperation with said support upon a workpiece on said support to secure a fitting on said workpiece in response to movement of said cylinder toward said base, a pump support on said cylinder projecting to one side of the plane of said rods and piston-cylinder assembly, said pump support being in the form of a flat support plate integral with said cylinder, a fluid pump mounted on the side of said plate remote from said base in spaced relation to said cylinder at said one side of said plane and adapted when operated to pump fluid into said piston-cylinder assembly to move said cylinder toward said base, said pump having a pivoted actuator adapted to be manually actuated by a handle projecting away from said plane to operate the pump as aforesaid, means for venting said piston-cylinder assembly, a guide rod projecting from said base parallel to the path of said cylinder and in spaced relation to said cylinder at the opposite side of said plane, a guide plate secured to the side of said support plate adjacent said base and projecting to said opposite side of said plane and having a hole slidably engaging said rod to resist distortion of said piston-cylinder assembly due to the operation of said pump, and a coil spring encircling said guide rod and compressed between said guide plate and said base to move said cylinder away from said base when said piston-cylinder assembly is vented.

2. A machine for swaging a fitting on a workpiece comprising a base, a frame including a pair of laterally spaced parallel rods extending from said base and a horizontal crosspiece extending between and connected to the ends of said rods remote from said base, a fluid piston-cylinder assembly having a cylinder member and a piston member provided with a piston head slidable within said cylinder member, means fixing one of said members to said crosspiece, said piston-cylinder assembly being positioned in the plane of said rods so that the other of said members can reciprocate relative to said fixed member toward and away from said base, a workpiece support, means removably mounting said workpiece support on said base, a swaging member, means removably connecting said swaging member to said reciprocable member in a position opposite said workpiece support and adapted to act in cooperation with said workpiece support upon a workpiece on said support to secure a fitting on said workpiece in response to movement of said reciprocable member toward said base, a pump support on said reciprocable member projecting to one side of the plane of said rods and said piston-cylinder assembly, a pump mounted on said pump support in spaced relation to said piston-cylinder assembly at said one side of said plane and adapted when operated to pump fluid into said piston-cylinder assembly to move said reciprocable member toward said base, said pump having a pivoted actuator adapted to be manually actuated by a handle projecting away from said plane to operate said pump as aforesaid, a guide rod projecting from said base parallel to the path of said reciprocable member and in spaced relation to said piston-cylinder assembly at the opposite side of said plane, and a guide member carried by said reciprocable member at said opposite side of said plane and slidably engaging said rod to resist distortion of said piston-cylinder assembly due to the operation of said pump.

3. The machine defined in claim 2, wherein said workpiece support comprises a die for receiving the end of a hose, and said swaging member comprises a pusher adapted to act in cooperation with said die upon said hose end in said die to secure a coupling on said hose end in response to movement of said reciprocable member toward said base.

4. The machine defined in claim 2, wherein said workpiece support comprises a first die for receiving a flexible linear member such as a cable, wire rope or the like, and said swaging member comprises a second die adapted to act in cooperation with said first die upon said linear member in said first die to secure a fitting such as a sleeve on said linear member in response to movement of said reciprocable member toward said base.

5. The machine defined in claim 2, wherein the means for removably connecting said swaging member to said reciprocable member includes a cylindrical member having one end removably secured in a socket on said reciprocable member and having a body portion projecting from said socket toward said base and removably connected to said swaging member.

6. The machine defined in claim 5, wherein said body portion of said cylindrical member is knurled and has a press fit in an opening in said swaging member.

7. A machine for swaging a fitting on a workpiece comprising a base, a frame including a pair of laterally spaced parallel rods extending from said base and a horizontal crosspiece extending between and connected to the ends of said rods remote from said base, a fluid piston-cylinder assembly having a cylinder member and a piston member provided with a piston head slidable within said cylinder member, means fixing one of said members to said crosspiece, said piston-cylinder assembly being positioned in the plane of said rods so that the other of said members can reciprocate relative to said fixed member toward and away from said base, a workpiece support on said base, a swaging member connected to said reciprocable member in a position opposite said support and adapted to act in cooperation with said support upon a workpiece on said support to secure a fitting on said workpiece in response to movement of said cylinder member toward said base, a pump, means mounting said pump on said reciprocable member at one side of the plane of said rods and said piston-cylinder assembly, said pump being adapted when operated to pump fluid into said piston-cylinder assembly to move said reciprocable member toward said base, said pump having a manually operable actuator by means of which said pump is operated as aforesaid, a guide rod projecting from said base parallel to the path of said reciprocable member at the opposite side of said plane, and a guide member carried by said reciprocable member at said opposite side of said plane and slidably engaging said rod to resist distortion of said piston-cylinder assembly due to the operation of said pump.

8. A machine for swaging a fitting on a workpiece comprising a base, a frame including a pair of laterally spaced parallel rods extending from said base and a horizontal crosspiece extending between and connected to the ends of said rods remote from said base, a fluid piston-cylinder assembly having a cylinder member and a piston member provided with a piston head slidable within said cylinder member, means fixing one of said members to said crosspiece, said piston-cylinder assembly being positioned in the plane of said rods so that the other of said members can reciprocate relative to said fixed member toward and away from said base, means on said base for removably mounting a workpiece support thereon, means on said reciprocable member for removably mounting a swaging member thereon in a position opposite the support to act in cooperation with such support upon a workpiece on the latter to secure a fitting on said workpiece in response to movement of said reciprocable member toward said base, a pump, means mounting said pump on said reciprocable member at one side of the plane of said rods and said piston-cylinder assembly, said pump being adapted when operated to pump fluid into said piston-cylinder assembly to move said reciprocable member toward said base, said pump having a manually operable actuator by means of which said pump is operated as aforesaid, a guide rod projecting from said base parallel to the path of said reciprocable member at the opposite side of said plane, and a guide member carried by said reciprocable member at said opposite side of said plane and slidably engaging said rod to resist distortion of said piston-cylinder assembly due to the operation of said pump.

9. The machine defined in claim 8, wherein said mounting means on said base is selectively operative to mount either a first die for a hose end or a second die for a cable, wire rope or the like, and said mounting means on said reciprocable member is selectively operative to mount either a pusher adapted to act in cooperation with such first die upon a hose end in such first die to secure a fitting such as a coupling on such hose end or a third die adapted to act in cooperation with such second die upon a cable, wire rope or the like in such second die to secure a fitting such as a sleeve thereon.

References Cited

UNITED STATES PATENTS

| | | | |
|---|---|---|---|
| 2,827,634 | 3/1958 | Kwasniewski | 29—203 |
| 2,978,800 | 4/1961 | Blain | 29—203 |
| 3,047,043 | 7/1962 | Albrecht | 29—237 |
| 3,072,174 | 1/1963 | Vanderhoof | 29—237 |

THOMAS H. EAGER, *Primary Examiner.*